Jan. 4, 1927.
E. E. MILLER
EXPANSIBLE PACKING
Filed June 12, 1925
1,613,355
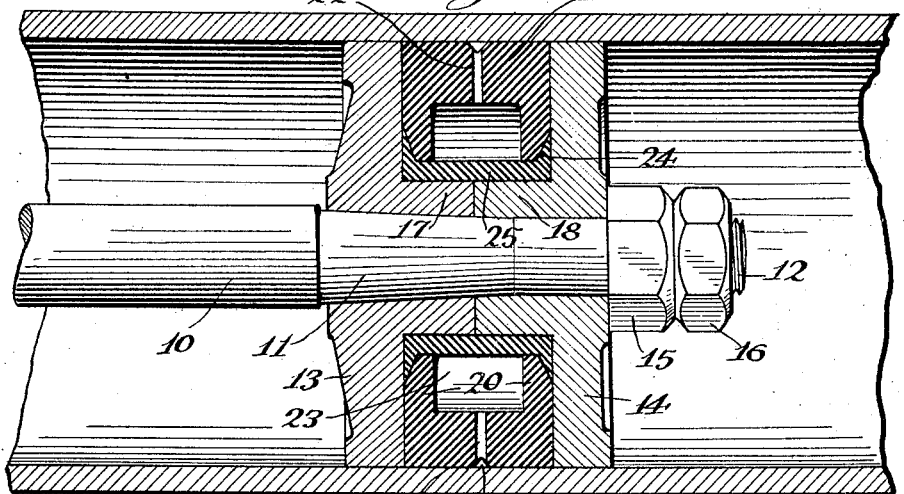
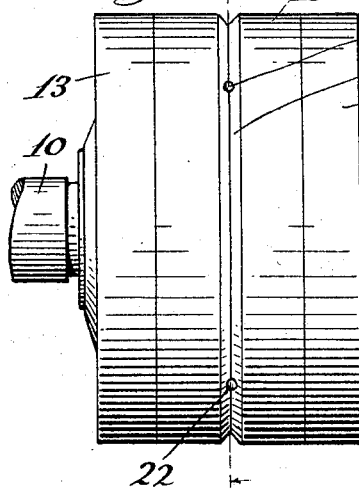
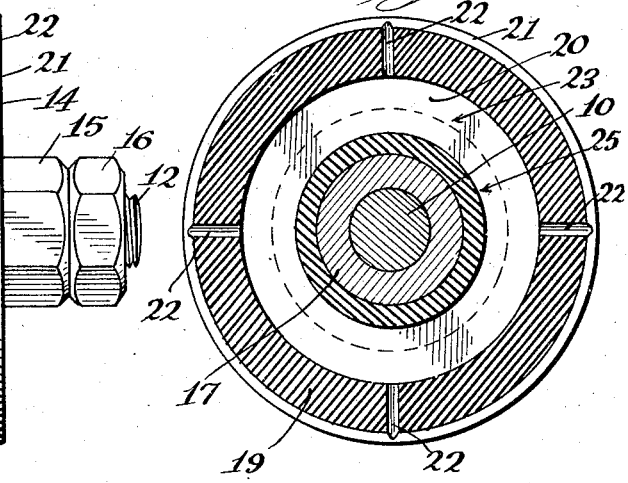
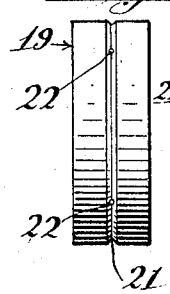
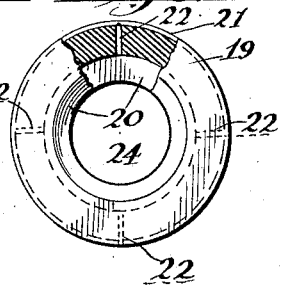
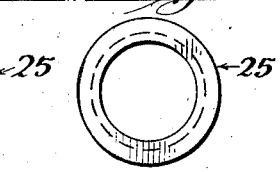
Inventor:
Erwin E. Miller
By Hazard and Miller
Attorneys.

Patented Jan. 4, 1927.

1,613,355

UNITED STATES PATENT OFFICE.

ERWIN E. MILLER, OF FULLERTON, CALIFORNIA.

EXPANSIBLE PACKING.

Application filed June 12, 1925. Serial No. 36,673.

This invention relates to improvements in plungers for pumps and the like and particularly to expansible packings and sealing rings for the plungers.

An object of the invention is to provide an expansible packing and sealing ring adapted to be applied to plungers, the sealing ring and packing being so constructed and so arranged that leakage of fluid pressure used to expand the packing is effectively prevented between the heads on the plunger.

Another object of the invention is to provide a plunger having an expansible packing ring which is so constructed that it will be maintained in concentric relation about the plunger rod.

Further objects of the invention are to provide an improved expansible packing of novel construction and a novel sealing ring.

With the foregoing and other objects in view which will be made manifest in the following detailed description and specifically pointed out in the appended claims, reference is had to the accompanying drawings for an illustrative embodiment of the invention, wherein:

Figure 1 is a vertical section through a pump cylinder or barrel and through the improved form of plunger disposed therein, Fig. 2 is a side elevation of the improved plunger, Fig. 3 is a vertical section taken on the line 3—3 of Fig. 2, Fig. 4 is a side elevation of the expansible packing, Fig. 5 is an end elevation, parts being broken away and shown in section, of the expansible packing, and Figs. 6 and 7 are a side elevation and an end elevation respectively of the sealing ring.

Referring to the accompanying drawings wherein similar reference characters designate similar parts throughout, the plunger rod is indicated at 10, having a tapered portion 11 and an exteriorly threaded cylindrical portion 12, although the particular construction of the plunger rod is somewhat immaterial. On the plunger rod there are disposed two heads, indicated at 13 and 14, which are maintained thereon by means of a nut 15 and a lock nut 16. The heads 13 and 14 have projecting hubs 17 and 18 which abut each other about the plunger rod.

The expansible packing, which is preferably formed of soft rubber or equivalent material, is indicated at 19, which has inwardly extending flanges 20 arranged adjacent its ends. On the peripheral surface of the packing 19 there is formed a groove 21, and radial apertures 22 communicate with the groove and with the space between the flanges 20 so as to provide ports whereby fluid pressure may be admitted to the annular chamber 23 between the flanges 20 to expand the expansible packing 19. The flanges 20 have their inner ends tapered to cooperate with the outwardly extending flanges 24 which are also tapered and which are formed upon the sealing ring 25 which is arranged about the abutting hubs 17 and 18 so as to prevent leakage between the hubs. It will be noted that the flanges 20 and 24 on the expansible packing and on the sealing ring overlap each other and that the ends or inner surfaces of the flanges 20 engage upon the body of the sealing ring 25.

The operation of this form of plunger is as follows: Fluid pressure enters through the ports 22 to the space between the packing 19 and the sealing ring 25 so as to expand the packing against the interior surfaces of the pump barrel or pump cylinder. The pressure within the chamber 23 urges the flanges 20 against the opposed faces of the heads 13 and 14 and against the flanges 24. The flanges 20 and 24 form a tight seal to prevent the escape or leakage of fluid between the abutting hubs 17 and 18.

An important feature of the invention resides in the fact that the ends or the interior surfaces of the flanges 20 abut against the sealing ring 25, which constitutes a part of the body of the plunger. The pumps for which the improved plungers are primarily designed, usually are so arranged that the cylinder or barrel is in horizontal position. Consequently the packing 19 tends to bear against the bottom of the barrel, because of its own weight, with a greater force than the force with which it bears against the top of the cylinder. It therefore follows that the wear on the bottom side of the expansible packing 19 is the greatest. The flanges 20 bearing against the body of the plunger tend to maintain the packing ring in concentric relation about the plunger rod 10, so that although the plunger is horizontally reciprocated, the wear will be more evenly distributed over all of the peripheral surface of the expansible packing. It will be readily appreciated that in overlapping the flanges 20 and 24, it is not necessary that the flanges be tapered, although this construction is preferably employed.

From the above it will be appreciated that an improved form of plunger is provided, in which the chamber 23 to which the fluid pressure is admitted is practically surrounded by rubber or equivalent material in such a manner that leakage therefrom is practically impossible.

It will be understood that various changes in the detail of construction may be made without departing from the spirit or scope of the invention as defined by the appended claims.

I claim:

1. A plunger for pumps and the like comprising a plunger rod, means providing heads upon the plunger rod, a sealing ring disposed between the heads, and an expansible packing disposed between the heads about the sealing ring having apertures therethrough, whereby fluid pressure may be admitted to the space between the sealing ring and the packing to expand the packing.

2. A plunger for pumps and the like comprising a plunger rod, means providing heads upon the plunger rod, an expansible packing disposed between the heads and bearing thereagainst, said packing having inwardly extending flanges, a sealing ring disposed between the heads having outwardly extending flanges, the flanges on the packing and on the sealing ring engaging each other, and means for admitting fluid pressure between the packing and the sealing ring to expand the packing.

3. A plunger for pumps and the like comprising a plunger rod, means providing heads upon the plunger rod, an expansible packing disposed between the heads having inwardly extending flanges, a sealing ring disposed between the heads having outwardly extending flanges, the flanges on the packing and on the sealing ring being tapered and overlapping, and means for admitting fluid pressure to the space between the packing and the sealing ring to expand the packing.

4. A plunger for pumps and the like comprising a plunger rod, means providing heads upon the plunger rod, an expansible packing disposed between the heads having inwardly extending flanges, a sealing ring disposed between the heads having outwardly extending flanges, the flanges on the packing and on the sealing ring engaging each other and overlapping, and means for admitting fluid pressure to the space between the sealing ring and the packing to expand the packing.

5. A plunger for pumps and the like comprising a plunger rod, means providing heads upon the plunger rod, a sealing ring disposed between the heads, an expansible packing disposed between the heads having inwardly extending flanges which are engageable upon the sealing ring, and means for admitting fluid pressure between the packing and the sealing ring to expand the packing.

6. An expansible packing for plungers comprising an unbroken or unsplit ring-like body having inwardly extending flanges and having an annular groove formed on its peripheral surface, there being radial apertures formed in the packing between the flanges, said apertures communicating with said groove, the flanges being inwardly tapered as and for the purpose described.

7. A plunger for pumps and the like comprising a plunger rod, a pair of heads upon the plunger rod having abutting hubs, a sealing ring disposed between the heads about the abutting hubs preventing leakage therebetween, said sealing ring having outwardly extending tapered flanges, and an expansible packing disposed between the heads having inwardly extending tapered flanges overlapping the flanges on the sealing ring, and means for admitting fluid pressure to the space between the packing and the sealing ring.

8. A plunger for pumps and the like comprising a plunger rod, a pair of heads upon the plunger rod having abutting hubs, a sealing ring disposed between the heads about the abutting hubs preventing leakage therebetween, said sealing ring having outwardly extending tapered flanges, and an expansible packing disposed between the heads having inwardly extending tapered flanges overlapping the flanges on the sealing ring, said packing having a groove formed on its peripheral surface and radial ports communicating therewith, whereby fluid pressure may be admitted to the space between the packing and sealing ring to expand the packing.

9. A plunger for pumps and the like comprising a plunger rod, two heads fitted onto the plunger rod, a sealing ring fitted between the heads having outwardly extending flanges, an expansible packing ring fitting between the heads having inwardly extending flanges engageable upon and overlapping the flanges on the sealing ring, and means for admitting fluid to the space between the packing ring, the sealing ring and their respective flanges.

In testimony whereof I have signed my name to this specification.

ERWIN E. MILLER.